United States Patent
Natsume (10) Patent No.: US 7,734,039 B2
(45) Date of Patent: Jun. 8, 2010

(54) TELEPHONE APPARATUS

(75) Inventor: Masahiko Natsume, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 12/089,513

(22) PCT Filed: Oct. 19, 2006

(86) PCT No.: PCT/JP2006/320870

§ 371 (c)(1),
(2), (4) Date: Apr. 7, 2008

(87) PCT Pub. No.: WO2007/046480

PCT Pub. Date: Apr. 26, 2007

(65) Prior Publication Data

US 2009/0147943 A1    Jun. 11, 2009

(30) Foreign Application Priority Data

Oct. 20, 2005    (JP)    .............................. 2005-306172

(51) Int. Cl.
 H04M 1/00    (2006.01)
 H04M 9/00    (2006.01)
(52) U.S. Cl. ........................... 379/428.02; 379/428.03; 379/433.01; 455/463
(58) Field of Classification Search .................. 379/419, 379/428.02, 428.03, 428.04, 433.01, 433.04, 379/441; 455/462, 463
See application file for complete search history.

(56) References Cited

U.S. PATENT DOCUMENTS 5,689,549 A    11/1997    Bertocci et al.

FOREIGN PATENT DOCUMENTS

| JP | 1-218223 A | 8/1989 |
| JP | 8-106371 A | 4/1996 |
| JP | 8-223282 A | 8/1996 |
| JP | 2004-120208 A | 4/2004 |

*Primary Examiner*—Tuan D Nguyen
(74) *Attorney, Agent, or Firm*—Birch, Stewart, Kolasch & Birch LLP (57) ABSTRACT

The invention relates to a telephone apparatus that allows, when additional installation of a handset unit ends in failure, an immediate retry of the additional installation with appropriate procedure and operations. At additional installation of a handset unit, a base unit (10) transmits an ID of the base unit (10) stored in a base ID storage portion (24*a*), a handset unit number inputted through a base key matrix (23), and an extension command for indicating an instruction of additional installation to a handset unit (30) wirelessly using a setting channel. When the handset unit number received fails to coincide with a handset unit number inputted through a handset unit key matrix (36), the handset unit (30) transmits a failure-indicating extension completion signal to the base unit (10), and its operation ends. Upon receiving the failure-indicating extension completion signal, the base unit (10) displays an operating guide on a base display device (15).

7 Claims, 7 Drawing Sheets

TELEPHONE APPARATUS

TECHNICAL FIELD

The present invention relates to a telephone apparatus having a handset unit.

BACKGROUND ART

Recently, as telephone sets in which a plurality of handset units can additionally be installed are made available, a growing number of users have come to buy a handset unit separately after the purchase of a telephone set for additional installation. In order to install an additional handset unit, there is a need to perform an extension process on a base unit and the handset unit. The extension process involves a step to register an identification code for identifying the base unit (hereafter referred to as "ID (Identification")) with the handset unit which is an afterward purchase, and a step to register the addition of the handset unit with the base unit.

To be more specific, the base unit and the handset unit of the telephone set are each provided with an extension mode, namely an operational mode designed specifically for installation of an additional handset unit. In order for the handset unit to be additionally installed in the base unit, it is necessary to bring both of the base unit and the handset unit into the extension mode by performing specific operations on the base unit and the handset unit. Following the establishment of the extension mode, a handset unit number for handset unit identification is inputted to the base unit to indicate the how-manieth handset unit to be additionally installed it is. Then, the base unit transmits the ID stored therein, the handset unit number inputted thereto, and a signal for indicating an instruction of additional installation to the handset unit wirelessly by means of a setting channel. Upon the receipt of the signals, the handset unit writes the ID and the handset unit number indicated by the signals received into memory means.

The handset unit transmits a signal for notifying the reception of the signal indicating an instruction of additional installation to the base unit by means of a setting channel. Upon the receipt of this signal, the base unit judges that the additional installation has been completed properly, and writes the addition of the handset unit into the memory means. In this way, the handset unit having stored therein the ID and the handset unit number can be wirelessly connected to the base unit from that time forward. Moreover, in a case where the handset unit will not be used any longer because of, for example, occurrence of malfunction in the handset unit additionally installed, there arises a need to cancel the data about the handset unit stored in the base unit. In order to cancel the handset unit data, it is necessary to perform operations for bringing the base unit and the handset unit into a cancel mode to erase the data about the handset unit which is no longer used.

For example, in Japanese Unexamined Patent Publication JP-A 1-218223 (1989) is disclosed a wireless telephone system composed of a base unit and a wireless terminal. In this wireless telephone system, in accompaniment with start-up of outgoing/incoming calling actions, transmission and reception of identification data for identifying the wireless telephone system are accomplished over a control channel, and, when agreement in identification data is observed, a shift toward phone-conversation channel connection control is effected. The setting of the identification data is carried out as follows. The base unit sends out identification data set for the base unit, as well as checking data inputted to the base unit, to the wireless terminal. When there is agreement between the checking data received by the wireless terminal and checking data inputted to the wireless terminal, the wireless terminal sets the received identification data in the rewritable memory of the wireless terminal. In this case, by setting the identification data in advance in the read-only memory of the base unit, it is possible to set the identification data in the rewritable memory of the wireless terminal simply by inputting the checking data. This eliminates the need to set the identification data in a handset unit manually.

For example, in Japanese Unexamined Patent Publication JP-A 8-223282 (1996) is disclosed a cordless telephone set in which an additional handset unit can be installed while a telephone call is in progress between its base unit and a service center. In this cordless telephone set, handset unit data for handset unit determination is set in the memory means of the base unit and in the memory means of the handset unit under the state where the base unit is catching a telephone line or during a telephone conversation over a telephone line. A user makes a phone call to the service center so that the additional handset unit can be installed properly with the help of an explanation given by a person in charge. Therefore, even if the user is unskilled in such an installation operation, additional installation of the handset unit can be completed with ease.

For example, in Japanese Unexamined Patent Publication JP-A 2004-120208 is disclosed a telephone apparatus which employs a plurality of control channels. In this telephone apparatus, after its base unit transmits a registration command to a handset unit for the purpose of registering the handset unit, if no response command to the registration command is issued from the handset unit, the base unit makes a second attempt to transmit the registration command following the changing of the control channel for registration command transmission. That is, even if the initial control channel for registration command transmission is different from the corresponding one of the handset unit, the base unit transmits the registration command following the completion of control channel changing. This obviates the necessity for the user to recognize the setting status of the control channel, and thus avoids the necessity for changing the control channel manually.

Additional installation or cancellation of a handset unit cannot be achieved without performing particular manual operations. Especially, in order to establish an extension mode or a cancel mode which is provided to prevent erroneous additional installation or cancellation, more often than not, complicated operations are required. Therefore, many users tend to make mistakes with operations related to additional installation or cancellation.

Furthermore, in carrying out additional installation, communications between a base unit and a handset unit are established by means of radio waves. In this case, the additional installation could end in failure for the following reasons: the base unit or the handset unit suffers from a trouble occurring in its radio wave control section; the frequency of radio waves employed in the additional installation is being in use by another telephone; or the conditions of radio waves become unstable due to occurrence of noise or the like. Thus, a failure in the extension process could occur for a variety of reasons including misoperation, telephone malfunction, radio wave conflict with another telephone, and radio wave conditions.

According to the art disclosed in JP-A 1-218223, identification data is set in advance in the read-only memory of the base unit. By doing so, the identification data can automatically be set in the rewritable memory of the wireless terminal. In this case, although misoperation associated with the setting of the identification data can be prevented, there is still a possibility of extension process failure due to other causes. According to the art disclosed in JP-A 2004-120208, by effecting the changing of the control channel for transmitting a registration command, it is possible to eliminate the need for manual operations required to resolve a control channel mismatch. However, there is still a possibility of extension process failure due to other causes. In these prior art practices, in the event of an extension process failure, the extension process is carried out once again with reference to an operating guide borne in an instruction manual or an operating guide displayed on the display screen of the base unit of the telephone set, for instance. However, in the case of referring to the operating guide borne in an instruction manual or the operating guide displayed on the display screen of the base unit of the telephone set or the like, much time and effort need to be taken to find out the description of a target operation. This gives rise to a problem that a retry of the extension process cannot be started immediately.

According to the art disclosed in JP-A 8-223282, even if an extension process failure occurs, it is possible to achieve the extension process with the help of an explanation given by a person in charge in the service center. In this case, there is no need for finding out the description of a target operation in the operating guide. However, even if the user makes a phone call to the service center to ask for an explanation given by a person in charge in the service center, it could be impossible to get through thereto due to line congestion. This gives rise to a problem that a retry of the extension process cannot be started immediately.

DISCLOSURE OF INVENTION

An object of the invention is to provide a telephone apparatus that allows, when additional installation of a handset unit ends in failure, an immediate retry of the additional installation with appropriate procedure and operations.

The invention provides a telephone apparatus comprising:
a base unit; and
a handset unit which is connected to the base unit by wireless communication,
wherein the base unit includes memory means for storing therein operating guide data representing an operational method intended for additional installation of the handset unit and display means for displaying thereon the operating guide data,
and wherein, at the time of additional installation of the handset unit, the base unit transmits an extension command for effecting additional installation, and, when there is no response to the transmitted extension command from the handset unit that response indicates a success, acts to display the operating guide data stored in the memory means on the display means.

According to the invention, in the base unit, the memory means stores therein the operating guide data representing the operational method intended for additional installation of the handset unit, and the display means displays thereon the operating guide data. The handset unit is connected to the base unit by wireless communication. Moreover, at the time of additional installation of the handset unit, the base unit transmits an extension command for effecting additional installation, and, when there is no response to the transmitted extension command from the handset unit that response indicates a success, acts to display the operating guide data stored in the memory means on the display means.

In this way, in the event of extension command failure, the base unit acts to display the operating guide data stored in the memory means on the display means. This allows, when additional installation of the handset unit ends in failure, a user to make an immediate retry of the additional installation with appropriate procedure and operations.

In the invention, it is preferable that the base unit acts to display the operating guide data stored in the memory means on the display means in a case where a response to the extension command that response indicates a success is not observed a predetermined number of times.

According to the invention, in a case where an extension command success is not observed a predetermined number of times, the base unit acts to display the operating guide data stored in the memory means on the display means. That is, the operating guide is not displayed until the user fails in a few attempts to achieve additional installation of the handset unit.

In the invention, it is preferable that in the memory means is stored cause-specific operating guide data representing an operational method for eliminating the cause of the absence of a response to the extension command that response indicates a success and an operational method intended for additional installation to be performed after the cause is eliminated, and that, in the base unit, when there is no response to the extension command that response indicates a success, out of the cause-specific operating guide data stored in the memory means, the cause-specific operating guide data corresponding to the cause of the absence of a response to the extension command that response indicates a success is displayed on the display means.

According to the invention, in the base unit, in the event of extension command failure, out of the cause-specific operating guide data stored in the memory means, the cause-specific operating guide corresponding to the cause of the extension command failure is displayed on the display means. This makes it possible to achieve additional installation in accordance with the procedure and operations corresponding to the cause of the extension command failure.

The invention provides a telephone apparatus comprising:
a base unit; and
a handset unit which is connected to the base unit by wireless communication,
wherein the base unit includes memory means for storing therein operating guide data representing an operational method intended for additional installation of the handset unit and display means for displaying thereon the operating guide data,
and wherein, at the time of additional installation of the handset unit, the handset unit transmits an extension command for effecting additional installation, and, when there is no response to the transmitted extension command from the base unit that response indicates a success, the base unit is operated in such a manner that the operating guide data stored in the memory means is displayed on the display means.

According to the invention, in the base unit, the memory means stores therein the operating guide data representing the operational method intended for additional installation of the handset unit, and the display means displays thereon the operating guide data. The handset unit is connected to the base unit by wireless communication. Moreover, at the time of additional installation of the handset unit, the handset unit transmits an extension command for effecting additional installation, and, when there is no response to the transmitted extension command from the base unit that response indicates a success, the base unit is operated in such a manner that the operating guide data stored in the memory means is displayed on the display means. In this way, since the extension command is transmitted from the handset unit to the base unit, it is possible to achieve additional installation under the initiative of the handset unit.

The invention provides a telephone apparatus comprising:

a base unit; and a handset unit which is connected to the base unit by wireless communication and includes memory means for storing therein operating guide data representing an operational method intended for additional installation of the handset unit and display means for displaying thereon the operating guide data, wherein, at the time of additional installation of the handset unit, the base unit transmits an extension command for effecting additional installation, and, when there is no response to the transmitted extension command from the handset unit that response indicates a success, the handset unit is operated in such a manner that the operating guide data stored in the memory means is displayed on the display means.

According to the invention, in the handset unit, the memory means stores therein the operating guide data representing the operational method intended for additional installation of the handset unit, and the display means displays thereon the operating guide data. The handset unit is connected to the base unit by wireless communication. Moreover, at the time of additional installation of the handset unit, the base unit transmits an extension command for effecting additional installation, and, when there is no response to the transmitted extension command from the handset unit that response indicates a success, the handset unit is operated in such a manner that the operating guide data stored in the memory means is displayed on the display means.

In this way, the base unit acts to display the operating guide data or the cause-specific operating guide data on the display means of the handset unit. This allows the user to see the operating guide at hand.

The invention provides a telephone apparatus comprising:

a base unit; and a handset unit which is connected to the base unit by wireless communication and includes memory means for storing therein operating guide data representing an operational method intended for additional installation of the handset unit and display means for displaying thereon the operating guide data, wherein, at the time of additional installation of the handset unit, the handset unit transmits an extension command for effecting additional installation, and, when there is no response to the transmitted extension command from the base unit that response indicates a success, the handset unit is operated in such a manner that the operating guide data stored in the memory means is displayed on the display means.

According to the invention, in the handset unit, the memory means stores therein the operating guide data representing the operational method intended for additional installation of the handset unit, and the display means displays thereon the operating guide data. The handset unit is connected to the base unit by wireless communication. Moreover, at the time of additional installation of the handset unit, the handset unit transmits an extension command for effecting additional installation, and, when there is no response to the transmitted extension command from the base unit that response indicates a success, the handset unit is operated in such a manner that the operating guide data stored in the memory means is displayed on the display means.

In this way, since the handset unit acts to display the operating guide data or the cause-specific operating guide data on the display means of the handset unit, it is possible to achieve additional installation under the initiative of the handset unit. This allows the user to see the operating guide at hand.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Now referring to the drawings, preferred embodiments of the invention are described below.

Figure 1:
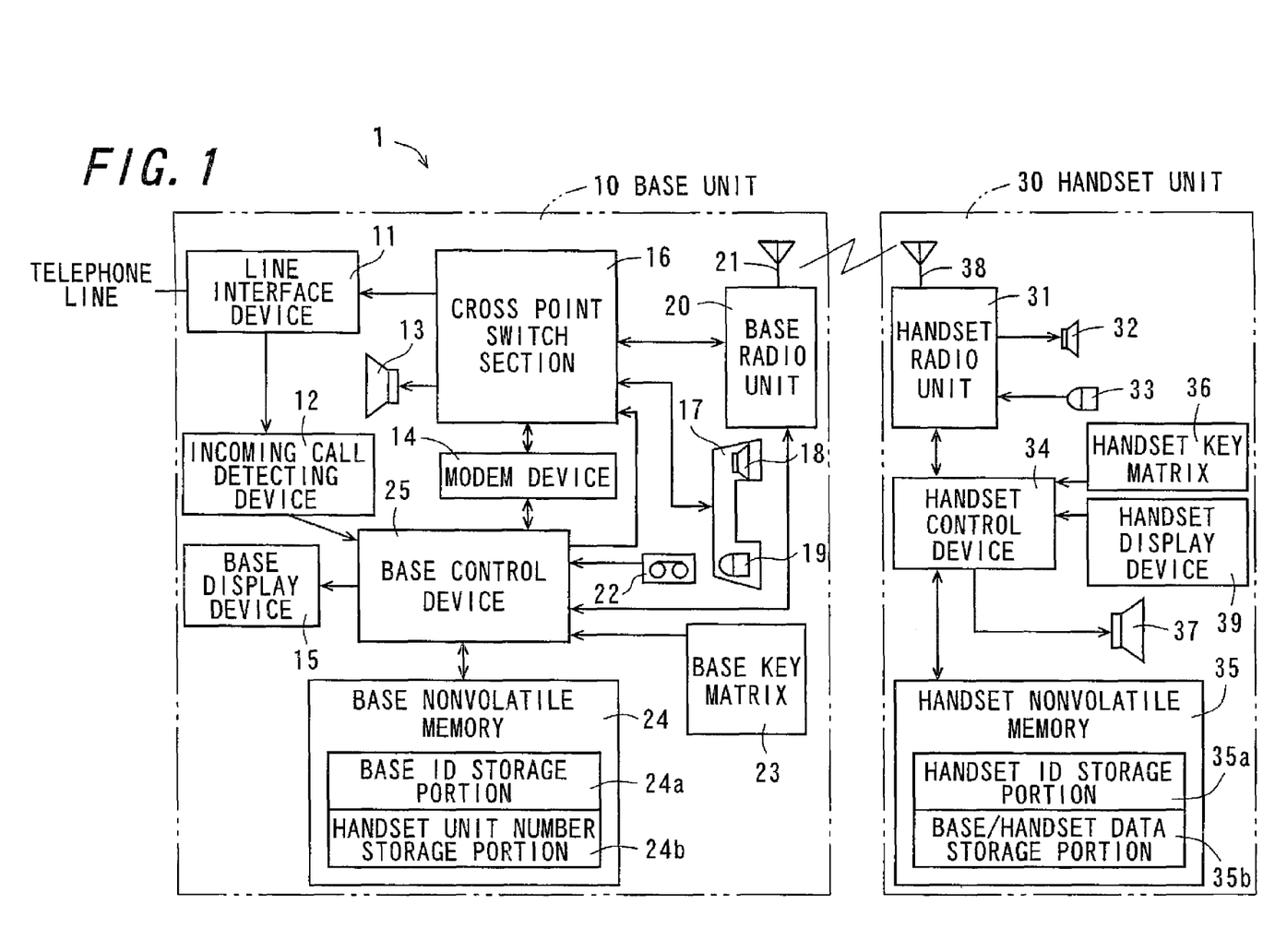
FIG. 1 is a block diagram of a cordless telephone set 1 in accordance with a first embodiment of the invention.

FIG. 1 is a block diagram of a cordless telephone set 1 in accordance with a first embodiment of the invention. A telephone apparatus refers, for example, to a cordless telephone set composed of a base unit and a handset unit or a facsimile machine. Hereinafter, the cordless telephone set 1 will be described by way of example. The cordless telephone set 1 includes a base unit 10 and a handset unit 30. The base unit 10 is designed to allow connection of a plurality of handset units 30 whereby the handset unit 30 can additionally be installed therein. The base unit 10 includes a line interface device 11, an incoming call detecting device 12, a base speaker 13, a modem device 14, a base display device 15, a cross point switch section 16, a telephone receiver 17 having a built-in base earpiece 18 and a base mike 19, a base radio unit 20, a base antenna 21, a hook switch 22, a base key matrix 23, a base nonvolatile memory 24, and a base control device 25.

The line interface device 11 is connected to a telephone line (hereafter abbreviated as "line") so as to carry out line control. The incoming call detecting device 12 detects an incoming call signal from the output produced by the line interface device 11. Upon the detection of an incoming call signal, the incoming call detecting device 12 informs the base control device 25 of the detection of the incoming call signal. The base speaker 13 serves as a speaker for outputting a sound such as a ringing sound at the time of, for example, incoming call arrival. The modem device 14 detects a signal from the line and also sends out a dial signal to the line. The base display device 15, which is a display device composed of a liquid crystal display or the like for displaying the conditions and innards of the apparatus, provides an indication of information under instructions from the base control device 25.

The cross point switch section 16 is a cross point switch to effect the changing of a path for transmitting sound signals. The telephone receiver 17 incorporates the base earpiece 18 and the base mike 19. The base earpiece 18 is, for example, an earpiece for outputting a sound. The base mike 19 is, for example, a microphone for inputting a sound. The base radio unit 20 is a radio unit composed of a receiver and a transmitter. The base antenna 21 is an antenna for establishing communications with the handset unit 30. The hook switch 22 is used for the placement of the telephone receiver 17. The base key matrix 23 is, for example, an input device which includes input keys for inputting information such as a dial number and operating keys for implementing the operation of the base unit 10.

The base nonvolatile memory 24 is a nonvolatile memory which includes a base ID storage portion 24a for storing an ID (Identification: Identifying code) for identifying the base unit 10 and a handset unit number storage portion 24b for storing a handset unit number for identifying an additional handset unit installed. The base control device 25 is composed of a CPU (Central Processing Unit), a ROM (Read Only Memory), a RAM (Random Access Memory), an I/O (Input/Output), and so forth (not shown in the figure). On the basis of information inputted through the I/O and information stored in the ROM and RAM, the CPU carries out control over the constituent components of the base unit 10. Programs and operating guide data to be executed by the CPU are stored in the ROM or the RAM, for example. Through the execution of the programs, the CPU carries out control over the constituent components of the base unit 10. The operating guide data is, for example, data representing an operating guide such as an operational method for use in installation of an additional handset unit.

The handset unit 30 includes a handset radio unit 31, a handset earpiece 32, a handset mike 33, a handset control device 34, a handset nonvolatile memory 35, a handset key matrix 36, a handset speaker 37, a handset antenna 38, and a handset display device 39.

The handset radio unit 31 is a radio unit composed of a receiver and a transmitter. The handset earpiece 32 is, for example, an earpiece for outputting a sound. The handset mike 33 is, for example, a microphone for inputting a sound. The handset control device 34 is composed of a CPU, a ROM, a RAM, an I/O, and so forth (not shown in the figure). On the basis of information inputted through the I/O of the handset unit 30 and information stored in the ROM and RAM of the handset unit 30, the CPU of the handset unit 30 carries out control over the constituent components of the handset unit 30. Programs to be executed by the CPU of the handset unit 30 are stored in the ROM or the RAM of the handset unit 30, for example. Through the execution of the programs, the CPU of the handset unit 30 carries out control over the constituent components of the handset unit 30.

The handset nonvolatile memory 35 is a nonvolatile memory which includes a handset ID storage portion 35a for storing an ID and a base/handset data storage portion 35b for storing a handset unit number. The handset key matrix 36 is, for example, an input device which includes input keys for inputting information such as a dial number and operating keys for implementing the operation of the handset unit 30. The handset speaker 37 is, for example, a speaker for outputting a sound such as a ringing sound. The handset antenna 38 is an antenna for establishing communications with the base unit 10. The handset display device 39, which is a display device composed of a liquid crystal display or the like for displaying the conditions and innards of the apparatus, provides an indication of information under instructions from the handset control device 34.

Figure 2:
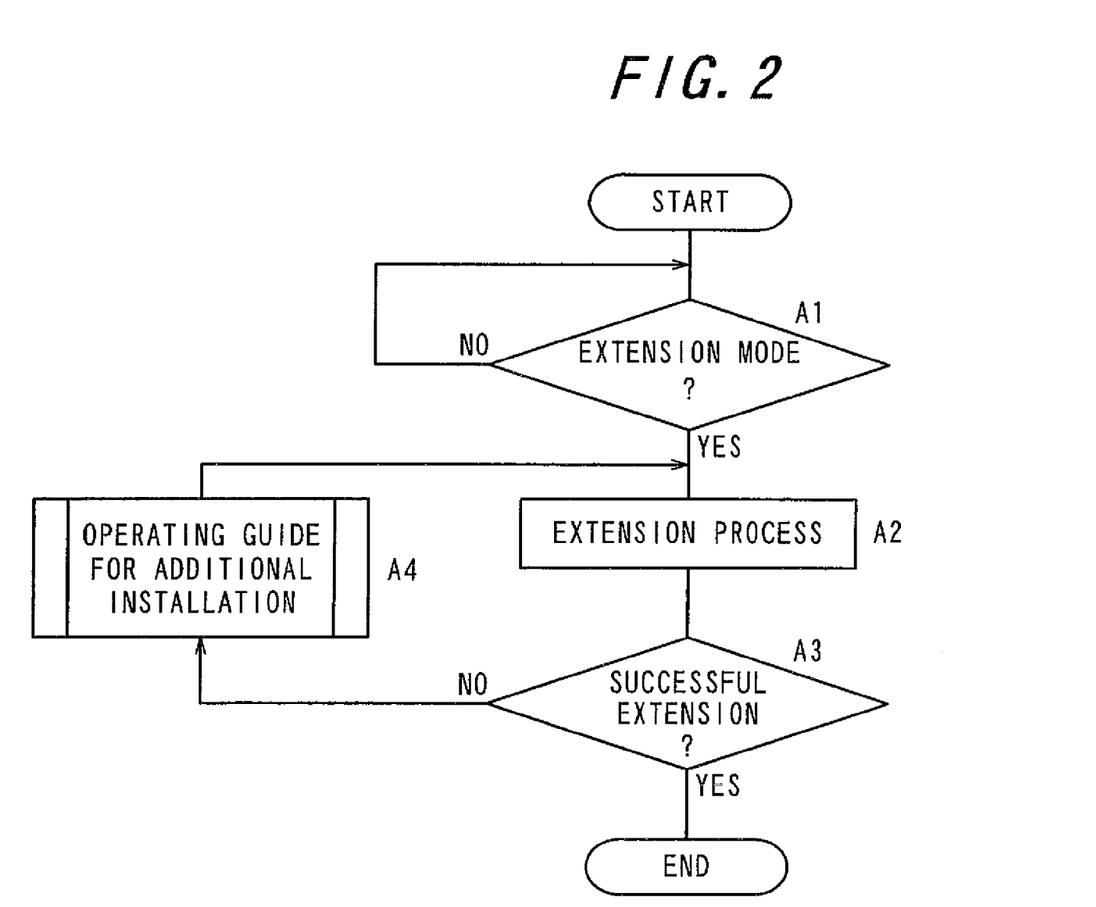
FIG. 2 is a flow chart showing the procedural steps followed to perform additional installation in the cordless telephone set 1 according to the first embodiment of the invention as shown in FIG. 1.

FIG. 2 is a flow chart showing the procedural steps followed to perform additional installation in the cordless telephone set 1 according to the first embodiment of the invention as shown in FIG. 1. Upon the cordless telephone set 1 being brought into the ready state following turning the base unit 10 on, the procedure proceeds to Step A1.

In Step A1, the base control device 25 determines whether an extension mode, namely an operational mode designed specifically for additional installation, is established or not. When the extension mode is found to be established, the procedure proceeds to Step A2. When the extension mode is found to be not established, the procedure returns to Step A1 to monitor the establishment of the extension mode. The establishment of the extension mode necessitates a specific operation. For example, on the part of the base unit 10, the extension mode can be established by pressing down a plurality of predetermined keys of the base key matrix 23 at one time. Similarly, on the part of the handset unit 30, the extension mode can be established by pressing down a plurality of predetermined keys of the handset key matrix 36 at one time.

In Step A2, an extension process is effected. The extension process refers to a process to set the ID stored in the base ID storage portion 24a and the handset unit number inputted through the base key matrix 23 in the handset nonvolatile memory 35 by means of an extension command for implementing additional installation. The details thereof will be explained with the aid of FIG. 3.

In Step A3, the base control device 25 determines whether the extension process has been completed successfully or not by the success or failure in the extension command. When the extension process is successful, the procedure comes to an end. When the extension process is unsuccessful, the procedure proceeds to Step A4. In Step A4, the base control device 25 effects control of the base display device 15 in a manner so as to display the operating guide intended for additional installation. Then, the procedure returns to Step A2.

The operating guide intended for additional installation refers to an operating guide indicated by the operating guide data stored in the ROM or RAM included in the base control device 25. For example, the operating guide shows an operational method for use in installation of an additional handset unit. The operating guide intended for additional installation, which is displayed on the base display device 15, is composed of a plurality of views which are displayed on the screen one after another. A cordless telephone set 1 user performs manipulations in accordance with the procedure indicated by each of the views. The operating guide intended for additional installation that is displayed on the base display device 15 will be described in detail with the aid of FIG. 4.

Figure 3:
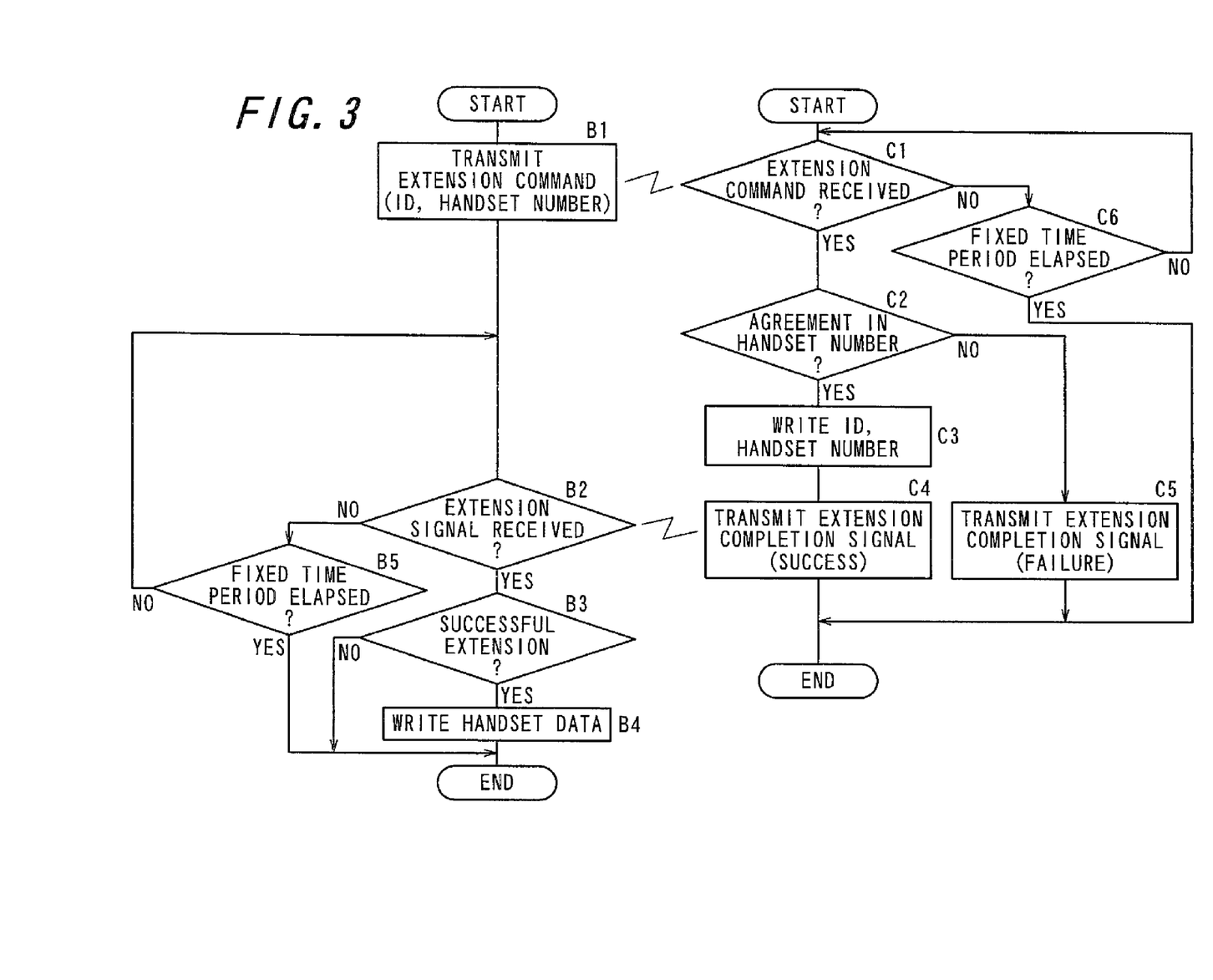
FIG. 3 is a flow chart showing an extension command operation to be performed in the cordless telephone set 1 according to the first embodiment of the invention as shown in FIG. 1.

FIG. 3 is a flow chart showing an extension command operation to be performed in the cordless telephone set 1 according to the first embodiment of the invention as shown in FIG. 1. The extension command operation is performed to achieve the extension process corresponding to Step A2 shown in FIG. 2. In the figure are shown a flow chart indicating the steps to be followed on the base unit 10's part and a flow chart indicating the steps to be followed on the handset unit 30's part in a corresponding manner. The procedural steps corresponding to Step B1 through Step B5 are implemented on the base unit 10's part by the base control device 25. In the base unit 10, when it is determined that the extension mode is established in Step A1 shown in FIG. 2, the procedure proceeds to Step B1. The procedural steps corresponding to Step C1 through Step C6 are implemented on the handset unit 30's part by the handset control device 34. In the handset unit 30, when a specific operation to establish the extension mode is effected, the procedure proceeds to Step C1.

In Step B1, the ID stored in the base ID storage portion 24a, the handset unit number inputted through the base key matrix 23, and the signal for indicating an instruction of additional installation are transmitted by way of an extension command. That is, the extension command is transmitted to the handset unit wirelessly by using a setting channel. The handset unit number is the number of a handset unit inputted through the base key matrix 23 by the user following the establishment of the extension mode. In Step B2, it is determined whether an extension signal is issued from the handset unit 30 or not. In the presence of the extension signal, the procedure proceeds to Step B3. In the absence of the extension signal, the procedure proceeds to Step B5. The extension signal is an acknowledgment signal issued from the handset unit 30 with respect to the extension command. Moreover, the extension signal is an extension completion signal for indicating a success or failure in the extension command. The extension completion signal is transmitted in Step C4 or Step C5.

In Step B3, whether the extension signal indicates a success or not is determined. That is, it is determined which of the success-indicating extension completion signal and the failure-indicating extension completion signal has been received. In the presence of the success-indicating extension completion signal, the procedure proceeds to Step B4. In the absence of the success-indicating extension completion signal; that is, in the presence of the failure-indicating extension completion signal, the procedure comes to an end. In Step B4, the handset unit data, namely the handset unit number transmitted in Step B1 is written into the handset unit number storage portion 24b. Then, the procedure comes to an end.

In Step B5, it is determined whether or not a fixed period of time has elapsed from the time of the extension command transmission in Step B1. When a lapse of the fixed time period is confirmed, the procedure comes to an end due to unsuccessful extension. When a lapse of the fixed time period is not confirmed, the procedure returns to Step B2 to monitor the extension signal. For example, the fixed time period is determined in consideration of the processing time required on the handset unit's part. The elapsed time is clocked with use of, for example, a clock for driving the CPU of the base control device 25.

In step C1, whether the extension command is received or not is determined. When the extension command is received, the procedure proceeds to Step C2. When the extension command is not received, the procedure proceeds to Step CG. The extension command is a signal sent from the base unit 10 in Step B1. In Step C2, it is determined whether or not the handset unit number received coincides with the handset unit number inputted on the handset unit 30's part. When there is agreement between them, the procedure proceeds to Step C3. When there is not agreement between them, the procedure proceeds to Step C5. The handset unit number inputted on the handset unit 30's part is, for example, the number of a handset unit inputted through the handset key matrix 36 by the user following the establishment of the extension mode in the handset unit 30.

In Step C4, the ID and the handset unit number received are stored in the handset ID storage portion 35a and the base/handset data storage portion 35b of the handset nonvolatile memory 35, respectively. In Step C4, an extension signal serving as the success-indicating extension completion signal is transmitted, and the procedure comes to an end. In Step C5, an extension signal serving as the failure-indicating extension completion signal is transmitted, and the procedure comes to an end. In Step C6, it is determined whether or not a fixed period of time has elapsed from the time of the establishment of the extension mode in the handset unit 30. When a lapse of the fixed time period is confirmed, the procedure comes to an end. When a lapse of the fixed time period is not confirmed, the procedure returns to Step C1 to monitor the extension command. For example, the fixed time period is determined in consideration of the processing-time required on the base unit 10's part. The elapsed time is clocked with use of, for example, a clock for driving the CPU of the handset control device 34.

Figure 4:
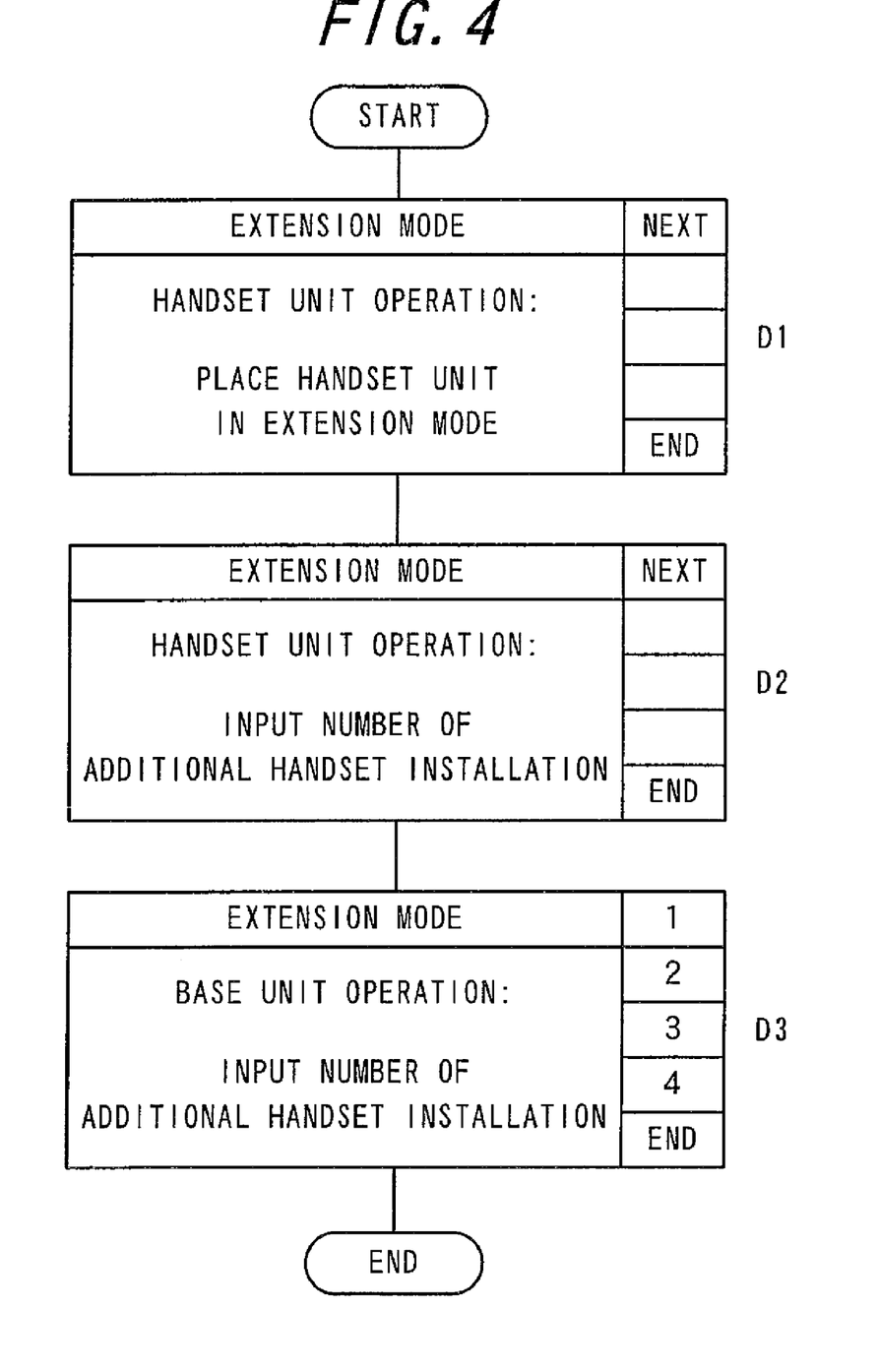
FIG. 4 is a flow chart showing an operation conformable to the operating guide to be performed in the cordless telephone set 1 according to the first embodiment of the invention as shown in FIG. 1.

FIG. 4 is a flow chart showing an operation conformable to the operating guide to be performed in the cordless telephone set 1 according to the first embodiment of the invention as shown in FIG. 1. This flow chart shows several views which are successively displayed on the base display device 15. The flow chart is provided for effecting the procedural step corresponding to Step A4 of the flow chart shown in FIG. 2. When it is determined in Step A3 that the extension process is unsuccessful, the procedure proceeds to Step D1.

In Step D1, the base control device 25 effects control of the base display device 15 in a manner so as to display the view illustrated as Step D1. In this view, on the upper left is displayed a text "Extension mode" indicating that the extension mode is being enabled. Displayed on the lower left of the view is a message "Handset unit operation: Place handset unit in extension mode". Displayed on the right-hand part of the view is a menu of choices for users in which the uppermost column bears a text "Next" indicative of an option to call up the next view and the lowermost column bears a text "End" indicative of an option to bring the operating guide to an end. The user performs a specific operation on the handset unit 30 to establish the extension mode. Following the establishment of the extension mode in the handset unit 30, the user chooses the option "Next" or chooses, when wishing to bring the operating guide to an end, the option "End" by means of the base key matrix 23. For example, the selection of options is made by operating the input keys included in the base key matrix 23.

In Step D2, the base control device 25 effects control of the base display device 15 in a manner so as to display the view illustrated as Step D2. In this view, on the upper left is displayed a text "Extension mode" indicating that the extension mode is being enabled. Displayed on the lower left of the view is a message "Handset unit operation: Input number of additional handset installation". Displayed on the right-hand part of the view is a menu of choices for users in which the uppermost column bears a text "Next" indicative of an option to call up the next view and the lowermost column bears a text "End" indicative of an option to bring the operating guide to an end. The user performs handset number input by means of the handset key matrix 36, and then chooses the option "Next" or chooses, when wishing to bring the operating guide to an end, the option "End" by means of the base key matrix 23.

In Step D3, the base control device 25 effects control of the base display device 15 in a manner so as to display the view illustrated as Step D3. In this view, on the upper left is displayed a text "Extension mode" indicating that the extension mode is being enabled. Displayed on the lower left of the view is a message "Base unit operation: Input number of additional handset installation". Displayed on the right-hand part of the view is a menu of choices for users that indicates, in order from top to bottom, the handset unit numbers "1" through "4" for handset number selection and a text "End" indicative of an option to bring the operating guide to an end. The user selects the same handset number as that inputted to the handset unit 30 in Step D2 from among the choices or selects, when wishing to bring the operating guide to an end, the option "End" by means of the base key matrix 23. Upon the selection of the handset number or the option "End", the procedure comes to an end.

In this way, in the base unit 10, in the event of extension command failure, the operating guide data stored in the ROM or RAM, namely memory means included in the base control device 25 is displayed on the base display device 15 acting as display means. This allows, when the additional installation of the handset unit 30 ends in failure, the user to make an immediate retry of the additional installation with appropriate procedure and operations. Therefore, even if the user is unskilled in such a process, the installation of an additional handset unit can be completed with ease.

Figure 5:
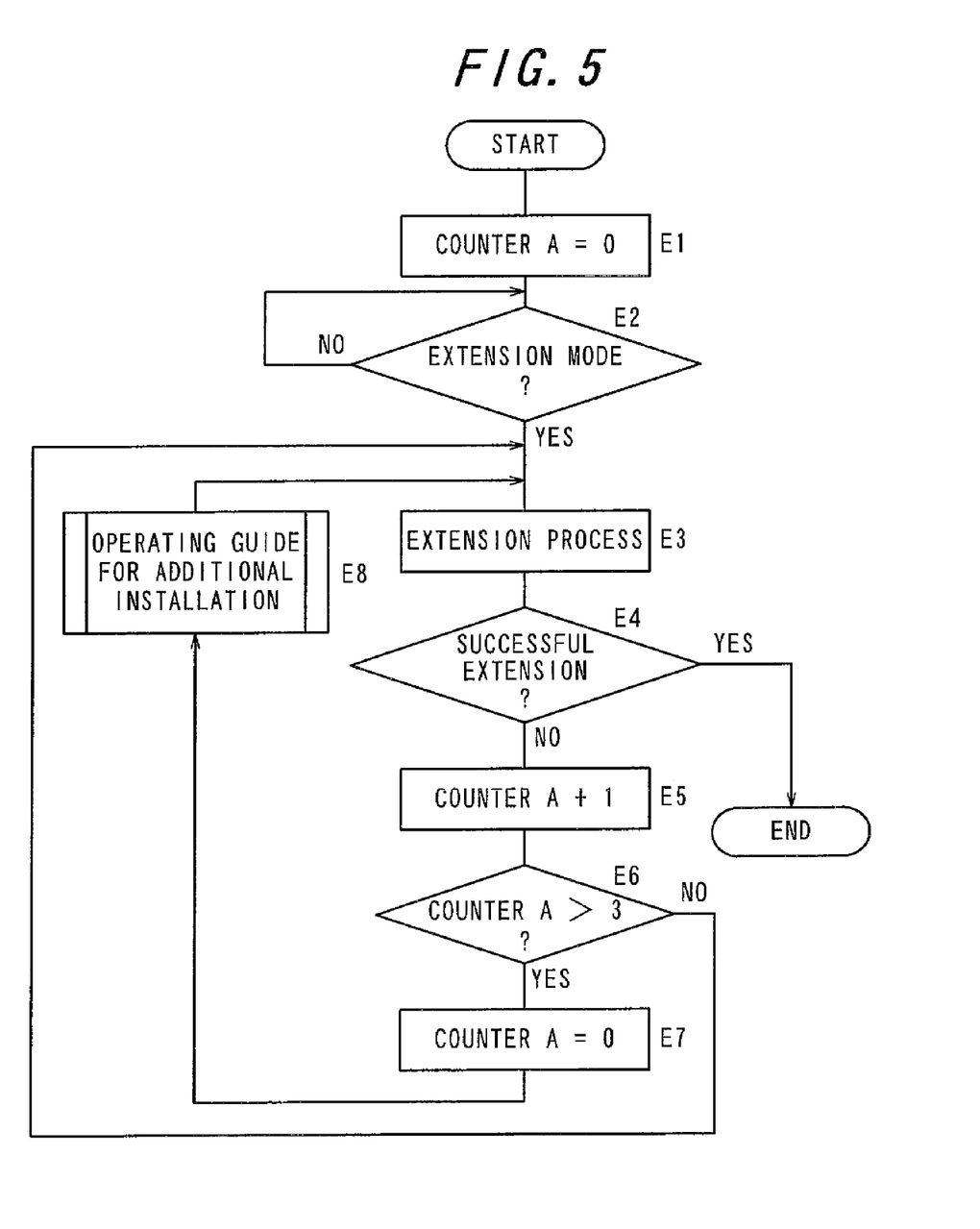
FIG. 5 is a flow chart showing the procedural steps followed to perform additional installation in the cordless telephone set according to a second embodiment of the invention.

FIG. 5 is a flow chart showing the procedural steps followed to perform additional installation in the cordless telephone set according to a second embodiment of the invention. The cordless telephone set of the second embodiment of the invention has the same structure as the cordless telephone set 1 shown in FIG. 1, and therefore the description thereof will be omitted. Upon the cordless telephone set 1 being brought into the ready state following turning the base unit 10 on, the procedure proceeds to Step E1.

In Step E1, the base control device 25 resets a counter A to "0". The counter A is, for example, a counter stored in the RAM included in the base control device 25. In Step E1, the counter A is reset only at the instant following power-up. From then on, no reset of the counter A takes place until power-down in Step E1.

In Step E2, the base control device 25 determines whether an extension mode, namely an operational mode designed specifically for additional installation, is established or not. When the extension mode is established, the procedure proceeds to Step E3. When the extension mode is not established, the procedure returns to Step E2 to monitor the establishment of the extension mode. The establishment of the extension mode necessitates a specific operation. For example, on the part of the base unit 10, the extension mode can be established by pressing down a plurality of predetermined keys of the base key matrix 23 at one time. Similarly, on the part of the handset unit 30, the extension mode can be established by pressing down a plurality of predetermined keys of the handset key matrix 36 at one time.

In Step E3, an extension process is effected. The extension process refers to a process to set the ID stored in the base ID storage portion 24a and the handset unit number inputted through the base key matrix 23 in the nonvolatile memory 35 by means of an extension command for implementing additional installation. Specifically, the operations as shown in FIG. 3 are carried out. In Step E4, the base control device 25 determines whether the extension process has been completed successfully or not by the success or failure in the extension command. When the extension process is successful, the procedure comes to an end. When the extension process is unsuccessful, the procedure proceeds to Step E5.

In Step E5, the base control device 25 adds "1" to the count of the counter A. In Step E6, the base control device 25 determines whether or not the count of the counter A is greater than a predetermined number, for example, a number "3". When the count of the counter A is smaller than or equal to "3", the procedure returns to Step E3. When the count of the counter A is greater than "3", the procedure proceeds to Step E7. In Step E7, the base control device 25 resets the counter A to "0". In Step E8, the base control device 25 effects control of the base display device 15 in a manner so as to display the operating guide intended for additional installation. Then, the procedure returns to Step E3. The operating guide intended for additional installation, which is displayed on the base display device 15, is composed of a plurality of views which are displayed on the screen one after another. The user performs manipulations in accordance with the procedure indicated by each of the views. The operating guide intended for additional installation that is displayed on the base display device 15 is the operating guide as shown in FIG. 4.

In this way, in the base unit 10, in a case where an extension command success is not observed a predetermined number of times, the operating guide data stored in the ROM or RAM, namely memory means included in the base control device 25 is displayed on the base display device 15 acting as display means. That is, the operating guide is not displayed until the user fails in a few attempts to achieve additional installation of the handset unit 30. Accordingly, the appropriate procedure and operations required to make a retry of the additional installation are displayed only in the presence of the user who repeats the same mistakes.

Figure 6:
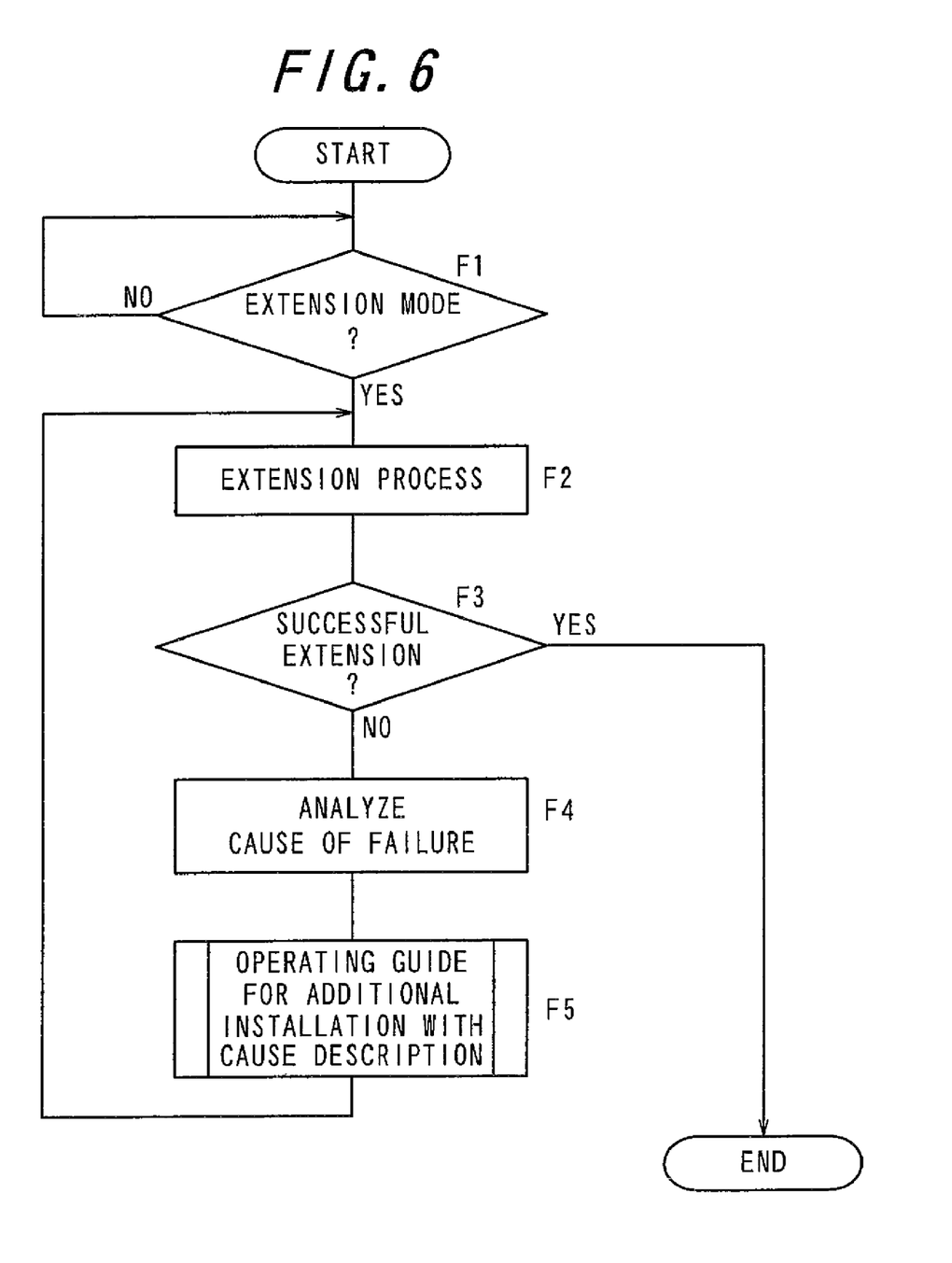
FIG. 6 is a flow chart showing the procedural steps followed to perform additional installation in the cordless telephone set according to a third embodiment of the invention.

FIG. 6 is a flow chart showing the procedural steps followed to perform additional installation in the cordless telephone set according to a third embodiment of the invention. The cordless telephone set of the third embodiment of the invention has the same structure as the cordless telephone set 1 as shown in FIG. 1, and therefore the description thereof will be omitted. Upon the cordless telephone set 1 being brought into the ready state following turning the base unit 10 on, the procedure proceeds to Step F1.

In Step F1, the base control device 25 determines whether an extension mode, namely an operational mode designed specifically for additional installation, is established or not. When the extension mode is established, the procedure proceeds to Step P2. When the extension mode is not established, the procedure returns to Step F1 to monitor the establishment of the extension mode. The establishment of the extension mode necessitates a specific operation. For example, on the part of the base unit 10, the extension mode can be established by pressing down a plurality of predetermined keys of the base key matrix 23 at one time. Similarly, on the part of the handset unit 30, the extension mode can be established by pressing down a plurality of predetermined keys of the handset key matrix 36 at one time.

In Step F2, an extension process is effected. The extension process refers to a process to set the ID stored in the base ID storage portion 24a and the handset unit number inputted through the base key matrix 23 in the nonvolatile memory 35 by means of an extension command for implementing additional installation. Specifically, the operations as shown in FIG. 3 are carried out. In Step F3, the base control device 25 determines whether the extension process has been completed successfully or not by the success or failure in the extension command. When the extension process is successful, the procedure comes to an end. When the extension process is unsuccessful, the procedure proceeds to Step F4. In Step F4, the base control device 25 carries out an analysis of the cause of the extension process failure, namely the cause of the extension command failure.

In Step F5, the base control device 25 effects control of the base display device 15 in a manner so as to display an operating guide intended for additional installation with a cause description corresponding to the analyzed cause of the failure (hereafter also referred to as "cause-specific operating guide"). Then, the procedure returns to Step F2. The cause-specific operating guide offers a solution to the cause of the error and also an operational method which is adopted for installation of an additional handset unit after the error problem arrives at a solution. The cause-specific operating guide, which is displayed on the base display device 15, is composed of a plurality of views which are displayed on the screen one after another. The user performs manipulations in accordance with the procedure indicated by each of the views. The cause-specific operating guide that is displayed on the base display device 15 will be described in detail with the aid of FIG. 7.

Figure 7:
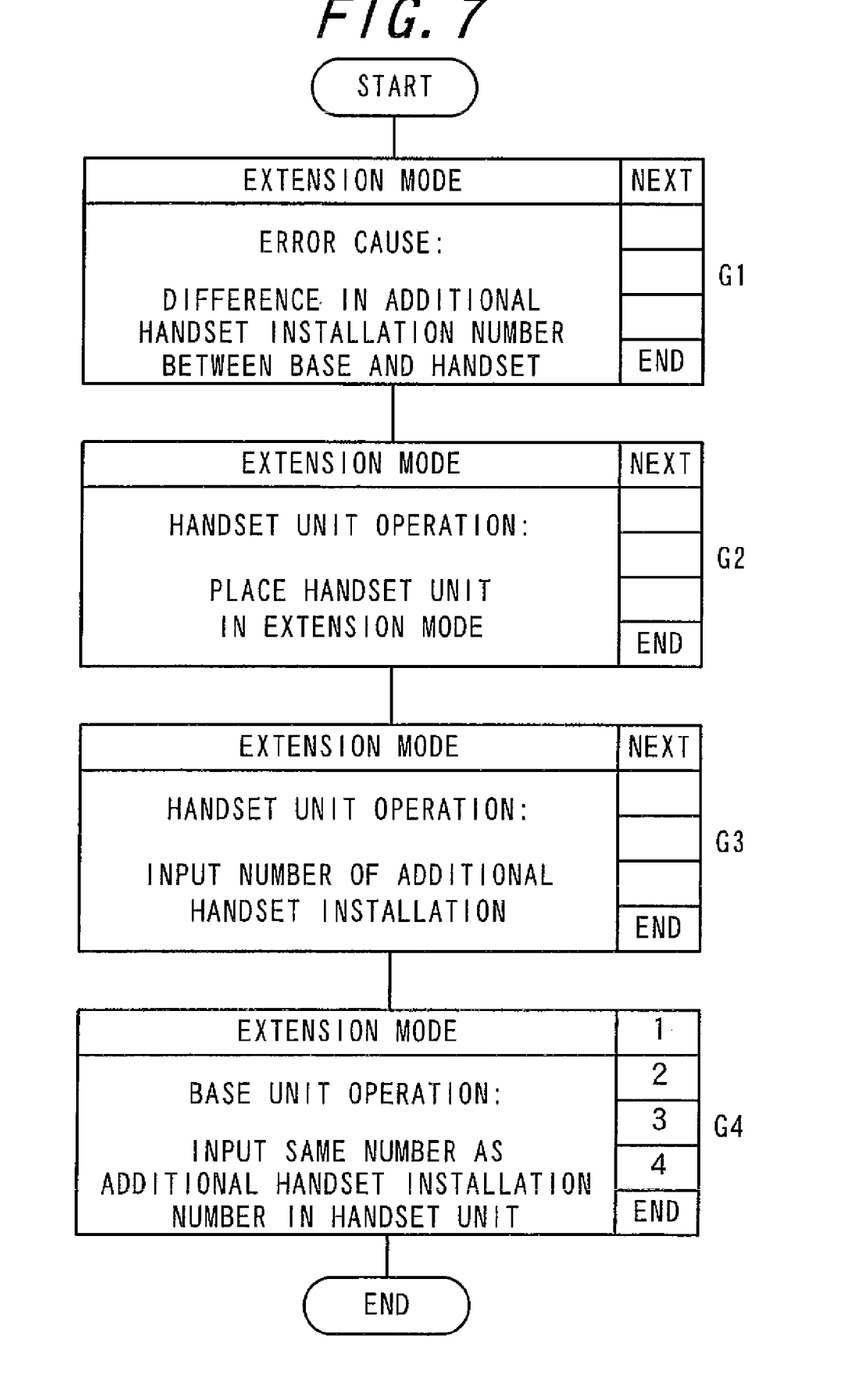
FIG. 7 is a flow chart showing an operation conformable to the cause-specific operating guide to be performed in the cordless telephone set according to the third embodiment of the invention as shown in FIG. 6.

FIG. 7 is a flow chart showing an operation conformable to the cause-specific operating guide to be performed in the cordless telephone set according to the third embodiment of the invention as shown in FIG. 6. This flow chart shows several views which are successively displayed on the base display device 15. The flow chart is provided for effecting the procedural step corresponding to Step E8 of the flow chart shown in FIG. 6. Following the completion of Step E7, the procedure proceeds to Step G1.

In Step G1, the base control device 25 effects control of the base display device 15 in a manner so as to display the view illustrated as Step G1. In this view, on the upper left is displayed a text "Extension mode" indicating that the extension mode is being enabled. Displayed on the lower left of the view is a message "Error cause: difference in additional handset installation number between base and handset" that indicates the cause of the extension command failure. Displayed on the right-hand part of the view is a menu of choices for users in which the uppermost column bears a text "Next" indicative of an option to call up the next view and the lowermost column bears a text "End" indicative of an option to bring the operating guide to an end. The user is able to recognize, from the message displayed on the lower left of the view, that the cause of the error is the difference in additional handset installation number, namely the difference in handset unit number, between the base unit and the handset unit. The user chooses the option "Next" to continue the additional installation of the handset unit 30 or chooses the option "End" to bring the operating guide to an end by means of the base key matrix 23.

In Step G2, the base control device 25 effects control of the base display device 15 in a manner so as to display the view illustrated as Step G2. In this view, on the upper left is displayed a text "Extension mode" indicating that the extension mode is being enabled. Displayed on the lower left of the view is a message "Handset unit operation: Place handset unit in extension mode". Displayed on the right-hand part of the view is a menu of choices for users in which the uppermost column bears a text "Next" indicative of an option to call up the next view and the lowermost column bears a text "End" indicative of an option to bring the operating guide to an end. The user performs a specific operation on the handset unit 30 to establish the extension mode. Following the establishment of the extension mode in the handset unit 30, the user chooses the option "Next" or chooses, when wishing to bring the operating guide to an end, the option "End" by means of the base key matrix 23.

In Step G3, the base control device 25 effects control of the base display device 15 in a manner so as to display the view illustrated as Step 63. In this view, on the upper left is displayed a text "Extension mode" indicating that the extension mode is being enabled. Displayed on the lower left of the view is a message "Handset unit operation: Input number of additional handset installation". Displayed on the right-hand part of the view is a menu of choices for users in which the uppermost column bears a text "Next" indicative of an option to call up the next view and the lowermost column bears a text "End" indicative of an option to bring the operating guide to an end. The user performs handset number input by means of the handset key matrix 36, and subsequently chooses the option "Next" or chooses, when wishing to bring the operating guide to an end, the option "End" by means of the base key matrix 23.

In Step G4, the base control device 25 effects control of the base display device 15 in a manner so as to display the view illustrated as Step G4. In this view, on the upper left is displayed a text "Extension mode" indicating that the extension mode is being enabled. Displayed on the lower left of the view is a message "Base unit operation: Input the same number as additional handset installation number in handset unit". Displayed on the right-hand part of the view is a menu of choices for users that indicates, in order from top to bottom, the handset unit numbers "1" through "4" for handset number selection and a text "End" indicative of an option to bring the operating guide to an end. The user selects the same handset unit number as that inputted to the handset unit 30 in Step G3 from among the choices or selects, when wishing to bring the operating guide to an end, the option "End" by means of the base key matrix 23. Upon the selection of the handset unit number or the option "End", the procedure comes to an end.

Although, as Step G1, an explanation has been given to the case where the error, namely the extension process failure, is attributed to the difference in handset unit number between the base unit and the handset unit, when it is caused by some other causes such as the difference in channel for extension command transmission between the base unit and the handset unit, a different message corresponding to the cause will be displayed. In this way, in the base unit 10, in the event of extension command failure, out of the cause-specific operating guide data stored in the ROM or RAM, namely memory means, included in the base control device 25, the cause-specific operating guide corresponding to the cause of the extension command failure is displayed on the base display device 15 acting as display means. This makes it possible to achieve additional installation in accordance with the procedure and operations corresponding to the cause of the extension command failure. Accordingly, the user is able to install an additional handset unit reliably without making the same mistakes.

Although, in the above-described embodiments, the extension command is transmitted from the base unit 10 to the handset unit 30 as shown in FIG. 3, it is also possible to transmit the extension command from the handset unit 30 to the base unit 10. That is, in the extension command operation shown in FIG. 3, the extension command is transmitted from the base unit 10 to the handset unit 30. On the other hand, the extension command can also be transmitted from the handset unit 30 to the base unit 10.

Specifically, after being placed in the extension mode by the extension command, the handset unit 30 transmits the ID of the base unit 10 and the handset unit number inputted through the handset key matrix 36 to the base unit 10. Then, the base unit 10 makes a comparison between the received ID and the ID stored in the base ID storage portion 24a, as well as a comparison between the received handset unit number and the handset unit number inputted through the base key matrix 23 following the establishment of the extension mode in the base unit 10. When there is agreement therebetween, the received handset unit number is registered with the handset unit number storage portion 24b, and a signal indicative of a success in additional installation is transmitted to the handset unit 30. Upon the receipt of the signal indicative of the additional installation success, the handset unit 30 acts to store the ID of the base unit 10 and the handset unit number inputted through the handset key matrix 36 in the handset ID storage portion 35a and the base/handset data storage portion 35b, respectively.

When there is disagreement between the received ID and the ID stored in the base ID storage portion 24a, or there is disagreement between the received handset unit number and the handset unit number inputted through the base key matrix 23, the base unit 10 transmits a signal indicative of a failure in additional installation to the handset unit 30 and simultaneously acts to display the operating guide or the cause-specific operating guide on the base display device 15.

In this way, since the extension command is transmitted from the handset unit 30 to the base unit 10, it is possible to achieve additional installation under the initiative of the handset unit 30. Accordingly, the user is able to start additional installation at the point in time when the handset unit 30 is put in a state of readiness for the additional installation.

Moreover, although, in the above-described embodiments, the operating guide is displayed on the base display device 15 of the base unit 10, it is also possible for the operating guide to be displayed on the handset display device 39 of the handset unit 30. Specifically, the operating guide data or the cause-specific operating guide data is stored in advance in the ROM or RAM included in the handset control device 34. In a case where the extension command is transmitted from the base unit 10's part, when the extension process ends in failure, the base unit 10 issues a signal for indicating an instruction of the display of the operating guide or the cause-specific operating guide to the handset unit 30, so that the operating guide data or the cause-specific operating guide data stored in the ROM or RAM included in the handset control device 34 can be displayed on the handset display device 39. Moreover, even if the base unit 10 issues a signal indicative of a success of additional installation to the handset unit 30 on the basis of the judgment that the extension process has been completed successfully, when the handset unit 30 judges that the extension process ends in failure, the handset unit 30 acts to display the operating guide data or the cause-specific operating guide data stored in the ROM or RAM included in the handset control device 34 on the handset display device 39.

In a case where the extension command is transmitted from the handset unit 30's part, when the extension process ends in failure, the handset unit 30 acts to display the operating guide data or the cause-specific operating guide data stored in the ROM or RAM included in the handset control device 34 on the handset display device 39.

In this way, in a case where the extension command is transmitted from the base unit 10's part, the base unit 10 acts to display the operating guide data or the cause-specific operating guide data on the handset display device 39 which is the display means of the handset unit 30. This allows the user to see the operating guide at hand. Accordingly, the ease-of-use of the system for the user can be improved.

Moreover, in a case where the extension command is transmitted from the handset unit 30's part, the handset unit 30 acts to display the operating guide data or the cause-specific operating guide data on the handset display device 39 which is the display means of the handset unit 30. Accordingly, additional installation can be achieved under the initiative of the handset unit 30, and the user is able to see the operating guide at hand. This allows the user to start additional installation at the point in time when the handset unit 30 is put in a state of readiness for the additional installation, thus leading to improvement in the ease-of-use of the system for the user.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, when installation of an additional handset unit ends in failure, the user is able to make an immediate retry of the additional installation with appropriate procedure and operations. Therefore, even if the user is unskilled in such a process, the installation of an additional handset unit can be completed with ease.

Moreover, according to the invention, the operating guide is not displayed until the user fails in a few attempts to achieve installation of an additional handset unit. Accordingly, appropriate procedure and operations required to make a retry of the additional installation are displayed only in the presence of the user who repeats the same mistakes.

Moreover, according to the invention, additional installation can be achieved in accordance with certain procedure and operations corresponding to the cause of extension command failure. Accordingly, the user is able to install an additional handset unit reliably without making the same mistakes.

Moreover, according to the invention, additional installation can be achieved under the initiative of a handset unit, and thus the user is able to start operations at the point in time when the handset unit is put in a state of readiness for the additional installation.

Moreover, according to the invention, since the user is able to see the operating guide at hand, it is possible to improve the ease-of-use of the system for the user.

Further, according to the invention, additional installation can be achieved under the initiative of a handset unit, and thus the user is able to see the operating guide at hand. This allows the user to start operations at the point in time when the handset unit is put in a state of readiness for the additional installation, thus leading to improvement in the ease-of-use of the system for the user.

The invention claimed is:

1. A telephone apparatus comprising:
   a base unit; and
   a handset unit which is connected to the base unit by wireless communication,
   wherein the base unit includes memory means for storing therein operating guide data representing an operational method intended for additional installation of the handset unit and display means for displaying thereon the operating guide data,
   and wherein, at the time of additional installation of the handset unit, the base unit transmits an extension command for effecting additional installation, and, when there is no response to the transmitted extension command from the handset unit that response indicates a success, acts to display the operating guide data stored in the memory means on the display means.

2. The telephone apparatus of claim 1, wherein the base unit acts to display the operating guide data stored in the memory means on the display means in a case where a response to the extension command that response indicates a success is not observed a predetermined number of times.

3. The telephone apparatus of claim 1, wherein in the memory means is stored cause-specific operating guide data representing an operational method for eliminating the cause of the absence of a response to the extension command that response indicates a success and an operational method intended for additional installation to be performed after the cause is eliminated, and wherein, in the base unit, when there is no response to the extension command that response indicates a success, out of the cause-specific operating guide data stored in the memory means, the cause-specific operating guide data corresponding to the cause of the absence of a response to the extension command that response indicates a success is displayed on the display means.

4. A telephone apparatus comprising:

a base unit; and a handset unit which is connected to the base unit by wireless communication, wherein the base unit includes memory means for storing therein operating guide data representing an operational method intended for additional installation of the handset unit and display means for displaying thereon the operating guide data, and wherein, at the time of additional installation of the handset unit, the handset unit transmits an extension command for effecting additional installation, and, when there is no response to the transmitted extension command from the base unit that response indicates a success, the base unit is operated in such a manner that the operating guide data stored in the memory means is displayed on the display means.

5. A telephone apparatus comprising:

a base unit; and a handset unit which is connected to the base unit by wireless communication and includes memory means for storing therein operating guide data representing an operational method intended for additional installation of the handset unit and display means for displaying thereon the operating guide data, wherein, at the time of additional installation of the handset unit, the base unit transmits an extension command for effecting additional installation, and, when there is no response to the transmitted extension command from the handset unit that response indicates a success, the handset unit is operated in such a manner that the operating guide data stored in the memory means is displayed on the display means.

6. A telephone apparatus comprising:

a base unit; and a handset unit which is connected to the base unit by wireless communication and includes memory means for storing therein operating guide data representing an operational method intended for additional installation of the handset unit and display means for displaying thereon the operating guide data, wherein, at the time of additional installation of the handset unit, the handset unit transmits an extension command for effecting additional installation, and, when there is no response to the transmitted extension command from the base unit that response indicates a success, the handset unit is operated in such a manner that the operating guide data stored in the memory means is displayed on the display means.

7. The telephone apparatus of claim 2, wherein in the memory means is stored cause-specific operating guide data representing an operational method for eliminating the cause of the absence of a response to the extension command that response indicates a success and an operational method intended for additional installation to be performed after the cause is eliminated, and wherein, in the base unit, when there is no response to the extension command that response indicates a success, out of the cause-specific operating guide data stored in the memory means, the cause-specific operating guide data corresponding to the cause of the absence of a response to the extension command that response indicates a success is displayed on the display means.

* * * * *